F. M. EVRINGHAM.
Hay-Rack.
No. 60,161. Patented Dec 4, 1866.
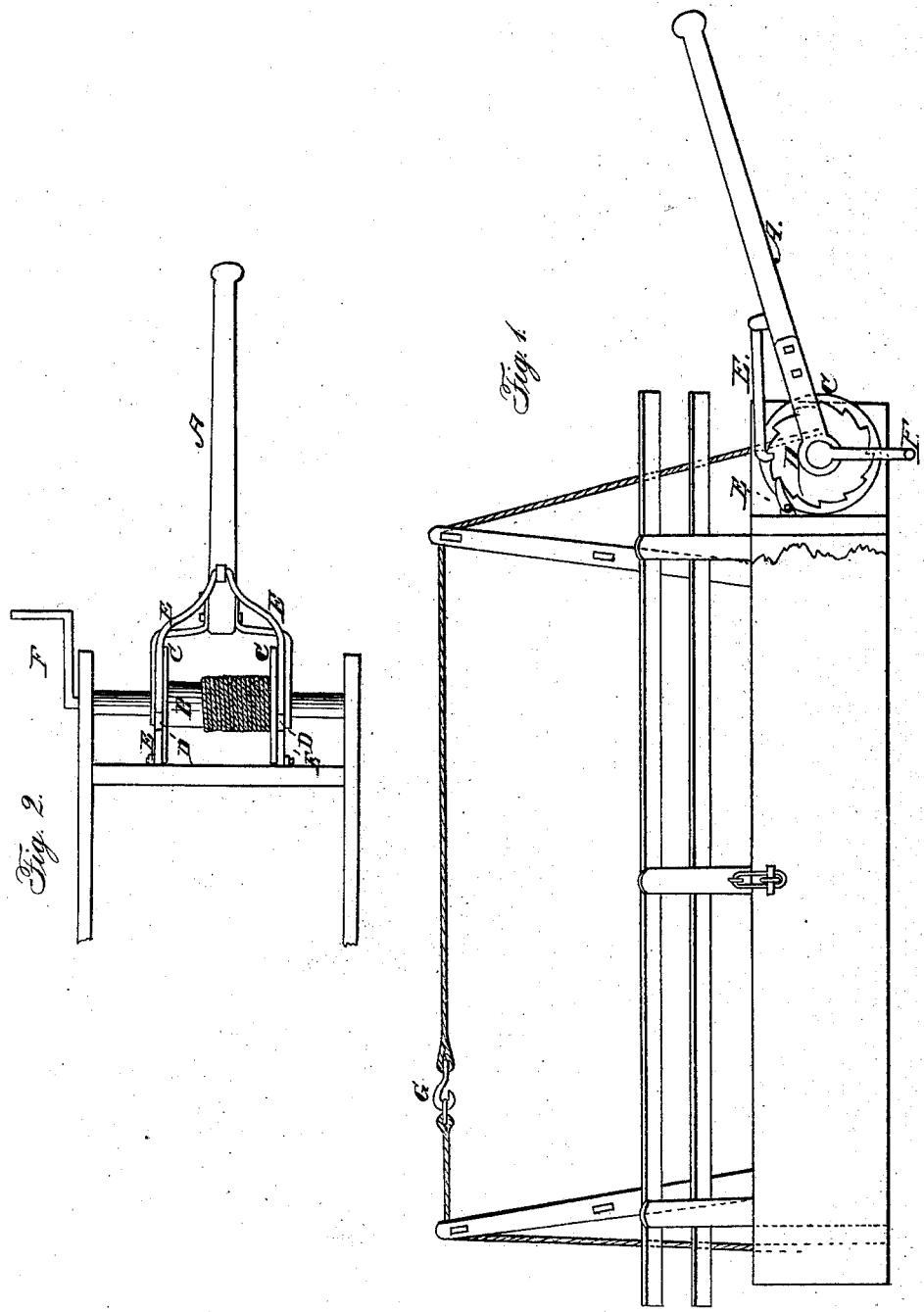

United States Patent Office.

IMPROVEMENT IN WAGON HAY-RACK.

FRANCIS M. EVRINGHAM, OF LAFAYETTE, NEW YORK.

Letters Patent No. 60,161, dated December 4, 1866.

SPECIFICATION.

Be it known that I, FRANCIS M. EVRINGHAM, of the town of Lafayette, in the county of Onondaga, and State of New York, have invented a new and useful Machine for Binding Loads of Hay and Grain on Wagons or Sleighs; and I do hereby declare that the following is a full, clear, and exact description of the construction and operation of the same, reference being had to the annexed drawings, making a part of this specification, in which—

Figure 1 is a side elevation.
Figure 2 is a plan.
Like letters refer to like parts.

Letter A represents the lever, letter B the drum, letter C the flange of the drum, letter D the ratchet, letters E E the catches, letter F the winch, letter G the rope and hook. The drum or shaft is made of wood or any other desired material, of about three inches in diameter at each end, and three and one-half inches in diameter between the ratchets, and is placed in the rear end of the side-boards of any hay or grain rack, except that the side-boards extend beyond the end-boards sufficient to receive it. The ends of the shaft or drum play in the holes made in the side-boards to receive each end. On one end of the shaft or drum, but outside of the side-board, is a winch for the purpose of turning the drum when the rope attached to the drum is not strained tight. Attached to the drum by two strong braces, but allowed to play freely, is the lever A, and on the drum, to the inside of the braces of the lever A, are fastened two flanges, and on the outside of the flanges are fastened two ratchets, a very little less in diameter than the flanges; also fastened to the upper side of the lever are two catches extending on and meshing into the teeth of the ratchets. A rope, one end of which is fastened to the drum, and is sufficiently long to reach on top of and to the forward end of the load of hay or grain, and a hook is fastened into one end of said rope. A rope is also fastened to the front end of the rack, and on the other end is fastened an eye. Said rope is just of sufficient length to reach on to the top of the load of hay or grain. When the hay-rack is loaded with hay or grain, the rope in front is brought to the top of the load, and the rope fastened to the drum is also brought on top of the load and hooked into the eye of the rope fastened to the front end of the rack. Then, by turning the winch the rope winds up around the drum and is drawn tight, pressing the hay or grain down to the rack, and, if desired to tighten the rope more, then take hold of the lever, and by raising it up the catches drop into the teeth of the ratchet, and by pressing down on the lever the rope can be drawn as tight as desired, thereby binding on the load of hay or grain so firmly that it cannot slip off from the rack.

What I claim as my invention, and desire to secure by Letters Patent, is—

The lever A, the drum B, the flanges C, the ratchet D, the catches E E, the winch F, and the rope G, when the same are constructed and operated substantially in the manner and for the purpose specified.

FRANCIS M. EVRINGHAM.

Witnesses:
L. F. SMITH,
L. C. FOOT.